G. F. STEEDMAN.
LUBRICATOR.
APPLICATION FILED MAY 4, 1914.
1,121,595.
Patented Dec. 15, 1914.
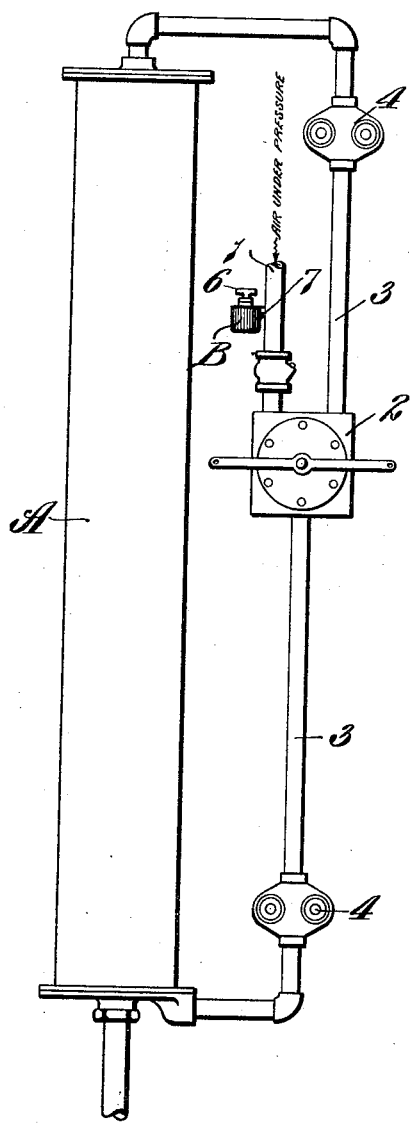
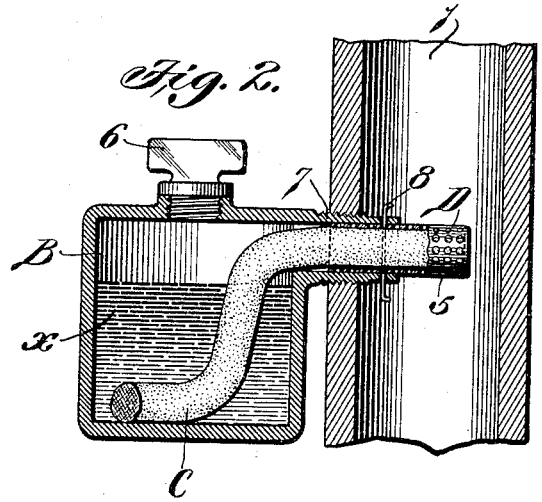
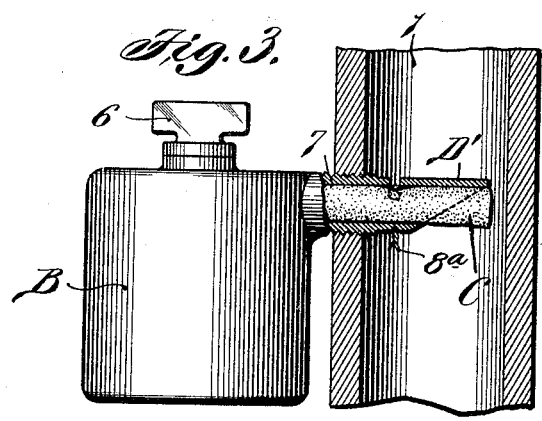
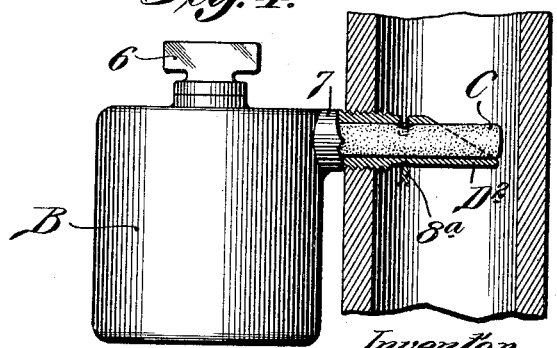
Inventor,
George F. Steedman.
By Bakewell & Church attys.

UNITED STATES PATENT OFFICE.

GEORGE F. STEEDMAN, OF ST. LOUIS, MISSOURI.

LUBRICATOR.

1,121,595.  Specification of Letters Patent.  Patented Dec. 15, 1914.

Application filed May 4, 1914. Serial No. 836,335.

*To all whom it may concern:*

Be it known that I, GEORGE F. STEEDMAN, a citizen of the United States, residing at St. Louis, Missouri, have invented a certain new and useful Improvement in Lubricators, of which the following is a full, clear, and exact description, such as will enable others skilled in the art to which it appertains to make and use the same.

This invention relates to lubricators, and particularly automatic lubricators which are so designed that the use of lubricant will cease when the machine or apparatus with which the lubricator is used ceases operating.

The main object of my invention is to provide a lubricator which is so designed that a current of air traveling through a conduit will draw oil from a source of supply and carry the oil to the parts which it is desired to lubricate, and that will use no lubricant when the current of air does not travel through said conduit.

Another object is to provide a device that will supply lubricant in a vaporized form to a machine or apparatus only while the apparatus continues in operation, the supply of lubricant from said device ceasing automatically when the apparatus stops, and still another object is to provide an efficient, simple and inexpensive lubricator for pneumatic machines and apparatus which is absolutely automatic in its operation and uses the ordinary oils of commerce.

Other objects and desirable features of my invention will be hereinafter pointed out.

Briefly stated, my invention consists in a lubricator comprising a capillary oil-supplying device arranged in communication with a supply of oil and projecting into an air conduit that leads to the part or parts which it is desired to lubricate, the current of air that travels through said conduit blowing the oil off said oil-supplying device and carrying the oil in a vaporized state to the parts which require lubrication.

My invention can be used successfully in various kinds of machines and apparatus in which a current of air traveling through a conduit either under pressure or by suction comes in contact with or acts upon the part or parts to be lubricated, and therefore I do not wish it to be understood that the invention is limited to use with an apparatus of the particular kind herein illustrated, namely, an air hoist, as this is only one of many types of apparatus that can be successfully lubricated by my improved lubricator.

Figure 1 of the drawings is a side elevational view of an air hoist equipped with a lubricator constructed in accordance with my invention. Fig. 2 is an enlarged vertical sectional view of the lubricator showing it applied to the conduit through which the actuating fluid travels. Fig. 3 is a side elevational view, partly in vertical section, illustrating a modification of my invention; and Fig. 4 is a similar view illustrating another modification of the invention.

Referring to the drawings which illustrate an air hoist equipped with my improved lubricator A designates the cylinder of the hoist, and 1 designates the supply pipe that leads from a supply of air under pressure to a valve casing 2, which is equipped with a valve for controlling the inlet and exhaust of the air to and from the opposite ends of the cylinder through the pipes 3, the hoist herein shown being equipped with speed control boxes 4 that are provided with valves.

I have herein illustrated my improved lubricator as being used for lubricating the piston in the cylinder A and also the valves in the valve casing 2, and the speed controlling boxes 4. Said lubricator consists of an oil reservoir or holder B that is adapted to hold a quantity of oil, and a porous oil-supplying device C arranged in engagement with the oil in the reservoir B and projecting in the air supply pipe 1. The oil supplying device C preferably consists of a piece of wick and the level of the oil in the reservoir B is below the point where the device C projects into the conduit 1, but capillary attraction causes oil to be drawn up through the porous device C whenever a current of air travels through the conduit 1. The current of air acting on the device C blows the oil off same and carries the oil in a vaporized state through the valve casing 2, pipe 3, and speed control boxes 4 into the cylinder A; thus keeping the piston and the valves of the apparatus lubricated. When the flow of air through the conduit 1 ceases, the supply of oil from the device C ceases owing to the fact that the oil is drawn up through the device C by capillary attraction. Consequently there is no possibility of the apparatus receiving an excessive supply of oil as would result if the oil were fed to the apparatus continuously drop by drop. Nor is there any possibility of the apparatus receiving an excessive supply or an inadequate supply as might result if a manually operated device were provided for starting and cutting off the supply of oil. The lubricator is absolutely automatic in operation, and it is of such simple construction that there is little liability of its getting out of order when it is in use. Furthermore, it can be manufactured at a low cost and it can be applied easily to various kinds of machines and apparatus in which a current of air traveling through a conduit acts upon or comes in contact with the parts of the apparatus which it is desired to lubricate.

The automatic feeding action of the wick may be compared to that of the ordinary coal oil lamp wick. In the lamp, one end of the wick is in the oil and the wick carries oil by capillary attraction to the burner, and the wick constantly supplies all the oil the flame needs so long as there is any oil in the lamp. If, however, there is no flame, there is no waste of oil, as the lamp does not overflow when not burning. In the same way, I vary the amount of oil consumed by varying the surface of the wick exposed.

A protector or shield D is preferably provided for the oil supply device C so as to prevent said device from being torn to pieces by the current of air in the conduit 1, and in the preferred form of my invention as shown in Fig. 2, said protector consists of a casing that surrounds the device C and it is provided with holes or perforations 5 so as to expose the device C to the current of air that travels through the conduit 1, the shield conforming to the shape of the oil-supplying device which, in the embodiment of my invention herein illustrated, is round in cross section. The reservoir B is provided with a removable closure 6 that normally closes the filling opening in the top of the reservoir and adjacent the upper end of the reservoir is a laterally projecting sleeve 7 that is screwed into the side wall of the air conduit 1 so as to support said reservoir and also hold the exposed portion of the oil supplying device C adjacent the center of the conduit 1 through which the air flows, said sleeve 7 projecting inwardly some distance from the side wall of the conduit 1. The tubular shaped protector or shield D projects into the sleeve 7, and when it is desired to increase the quantity of oil supplied by the device C said shield is moved farther into the conduit 1 so that more of the device C will be exposed to the air that travels through said conduit. When it is desired to diminish the supply of oil, the shield D is retracted slightly. Any suitable means may be employed for holding the oil-supplying device C and its protecting shield in adjusted position, but one means that I have found to be very efficient consists of a wire retaining pin 8 that passes transversely through the oil-supplying device, through the shield D and through holes in the sleeve 7; the ends of said pin being bent slightly as shown in Fig. 2, so as to hold it in position. In view of the fact that the operating shield D is provided with numerous holes or perforations that are arranged close together, it is possible with such a construction to accurately regulate the supply of oil to the apparatus. Furthermore, as the retaining pin 8 passes transversely through the oil-supplying device C, it prevents said device from being displaced or drawn out of the shield D in case the end of said shield is open.

In Fig. 3 I have illustrated a slight modification of my invention wherein the protector or shield D' for the oil-supplying device C is formed by an extension on the sleeve 7, the underside of said extension being cut off at an angle so that a portion of the device C will be exposed to the current of air traveling through the conduit 1, the device C being held in adjusted position and also securely locked to the shield by means of a piece of wire $8^a$ that passes transversely through a slot in the upper side of the shield D'. Fig. 4 illustrates a similar structure, except that the upper side of the shield $D^2$ is cut off at an angle, thus exposing the upper sides of the oil-supplying device C to the direct action of the current of air traveling through the conduit 1, such construction being very efficient for an apparatus in which the pressure of the air in the conduit 1 is not so great that it would tend to tear a porous fuel-supplying device to pieces.

Having thus described my invention, what I claim as new and desire to secure by Letters Patent is:

1. A lubricator for the purpose described, comprising a porous oil-supplying device that is adapted to be arranged in a conduit through which air flows, a reservoir for holding oil that is supplied to said device by capillary attraction, said device leading from the upper portion of said reservoir at a point above the level of the oil in same, and an adjustable perforated shield that surrounds said oil-supplying device and projects laterally into said air conduit.

2. A lubricator for the purpose described, comprising an oil reservoir, a porous oil-supplying device communicating with the oil in said reservoir and adapted to be arranged in a passageway through which a current of air flows, and a sleeve on the upper portion of said reservoir that connects the reservoir to the conduit through which the air flows and also acts as a support for the oil-supplying device, said sleeve projecting into said conduit so as to hold the exposed portion of said oil-supplying device adjacent the center of said air conduit.

3. A lubricator for the purpose described, consisting of an oil reservoir provided with a sleeve that is adapted to be connected to a conduit through which a current of air travels, a porous oil-supplying device in said sleeve that projects into said conduit and which communicates with the oil in said reservoir, a shield for protecting a portion of said device which projects into said conduit, and means coöperating with said sleeve for holding said shield in position.

4. An automatic lubricator consisting of a suitable oil chamber with filling plug connected with an air-carrying pipe, a capillary conductor with its lower end in the oil chamber and its upper end so placed as to come in contact with a current of air in the pipe, and an adjustable perforated protecting shell so arranged that a greater or less area of the capillary conductor may be exposed to the action of the air current.

In testimony whereof I hereunto affix my signature in the presence of two witnesses, this thirtieth day of April, 1914.

GEORGE F. STEEDMAN.

Witnesses:
R. E. WINKLER,
L. S. BUCKLES.

Copies of this patent may be obtained for five cents each, by addressing the "Commissioner of Patents, Washington, D. C."